Patented Nov. 10, 1931

1,831,740

UNITED STATES PATENT OFFICE

EGON ELÖD AND LUDWIG THOMAS, OF KARLSRUHE, GERMANY

PRODUCTION OF FIBERS FROM COCOANUTS

No Drawing. Application filed January 9, 1929, Serial No. 331,387, and in Germany January 14, 1928.

This invention relates to the manufacture of fibers from the covering of the cocoanut.

The production of fibers (spinning fibers, brush fibers and stuffing fibers) from the covering of the cocoanut fruit has hitherto been achieved with the aid of the so-called roasting or rotting process.

In this process the layers of cork-like substance residing between the fibers are destroyed or loosened by the action of bacteria or the like decomposition processes attended by putrefaction, so that the fibers may be separated mechanically. This process, which takes many months, often leads to various losses and the fibers are impaired with respect to their mechanical properties, colour and appearance.

It has recently been proposed to treat the covering of the cocoanut with hot dilute alkali-metal hydroxide solution. This process has the disadvantage that the substances contained in the intermediate cork-like layer are highly dispersed or peptonized by the action of the hot alkali-metal hydroxide solution by reason of which undesirable colouring is occasioned and the valuable bright or light yellow self-colour is lost. A considerable increase in cost of the process also results, by reason of the necessary importation of the chemicals used.

According to this invention, the production of fiber is achieved in a simple and cheap manner in a few hours, giving a product which retains completely the valuable mechanical and physical properties of the cocoanut fiber together with a bright natural colour, by a suitable treatment of the coverings with hot water.

According to the invention the fruit coverings of the cocoanut are first subjected to a comparatively short treatment with hot water for example by immersing the fruit coverings into hot water and holding it beneath the surface for about 2 to 3 hours, stirring means being preferably provided for instance in such a way, that the hot water or the fruit covering or both are agitated. The material pre-treated in such a manner is then subjected to a mechanical treatment for example by pressing or squeezing it between grooved rollers or the like. The fiber compress is then subjected to a further treatment with hot water in the same manner as described above. By this second water treatment, which generally occupies not more than one to two hours, the cork-like embedding substance of the fibers is brought into such a state of swelling, that the fiber may be set free by treating them in the usual manner with brush rollers, combs or the like, thus removing the molten and loosened embedding substance.

Both the hot water treatments are preferably carried out at temperatures above 60° C., such as 85–90° C. It is advisable to add substances preventing discolouration of the fibers during the second water treatment. Substances for the purpose in question are for example small amounts of slaked lime such as 1% of slaked lime. By these additions tanning substances and the like washed out from the embedding substances are precipitated or flocculated out, in which state they cannot discolourize the fiber. The water treatment of the fruit coverings is carried out by keeping them for example by packing them in wire nets or the like, below the surface of the water.

The coverings may be packed in baskets from wire net, iron screen or the like, and the latter are submerged in a vessel filled with hot water. It is advisable, to provide arrangements for moving the baskets below the water level for example by providing the baskets with rollers running in rails or similar arrangements of the vessel. The water treatment may be carried out continuously, for example, by introducing the baskets at one side into the vessel filled with hot water, passing the baskets below the water level through the vessel and removing the baskets from the vessel at the opposite side.

It is advisable to keep the water in motion, by cyclic circulation, agitation or the like, thus obtaining not only a uniform heating of the water and a uniform contact between the water and the fruit coverings, but also easily removing tanning agents and similar suspended substances, from the liquid, which during the cyclic circulation may pass filters.

The following example serves to illustrate the manner in which the invention may be carried into effect.

The fruit coverings of cocoanuts cut into four to six segments and placed in containers, for example, in a basket constructed from wire-net, iron screen or the like, are submerged in a vessel filled with hot water of about 85–90° C. The basket is preferably provided with means for agitation below the surface of the water, for example, the basket may be provided with rollers or the like, above and beneath, which enable the basket to be moved on rails or similar members. The duration of the steeping may, for example, be from two to three hours, perhaps even less.

The process may be carried out continuously, for example in such a way that the basket filled with fruit coverings is led into one side of the vessel and during the treatment period is gradually conveyed beneath the surface of the water and is then withdrawn at the other side of the vessel.

The fruit coverings from the baskets may now further be treated mechanically, for instance in such a way, that the fruit coverings are subjected to pressing between grooved rollers or the like, by which a further loosening of the fiber structure results. The fiber compress is then packed into the basket and introduced into the hot water of about 85–90° C. afresh. At this second treatment with water, material which is able to prevent discolouration may advantageously be added. This may be effected by the addition of a small mixture (for example 0.1% of slaked lime, whereby the tannic acid and the like washed out from the fiber compress is converted to a flocculent precipitate, in which form it is unable to colour the fiber. The second washing may for example occupy one to two hours. The liquid in both vessels may be similarly agitated by means of circulating pumps, stirrers or the like, by which in the first place a uniform heating of the liquid and a uniform washing of the fruit coverings is obtained and in the second place flocculated tannic acid and other suspended matter may be removed, for example in such a way, that the liquid in circulation is adapted to be led through a filter device.

After the second treatment the fiber may be freed by the usual methods, for example by treatment of the fiber compress with brush rollers, combs or the like. This mechanical treatment is preferably carried out under a flow of water. By the mechanical treatment, the short spinnable fibers and also the more complicated stuffing fiber may easily be separated from the long, thick straight fibers which remain in the natural state.

The long thick fibers may be obtained in clean bright form, ready for drying, and further treatment or for shipping. The short fibers may be freed from any residue of embedding substances still adhering, for example by heating following the drying.

We claim:

1. A method for the production of fibers from the covering of cocoa nuts which consists in immersing the material for a short period in hot water, subjecting the mass obtained to a mechanical pressing treatment, immersing the pressed mass for a second short period in hot water and separating the embedded fibers from the embedding substance by mechanical treatment, and adding substances of the slacked lime type preventing undesired discolouration of the fibers to the water used for the second hot water treatment.

2. A method for the production of fibers from the covering of cocoa nuts which consists in immersing the material for a short period in hot water, subjecting the mass obtained to a mechanical pressing treatment, immersing the pressed mass for a second short period in hot water and separating the embedded fibers from the embedding substance by mechanical treatment, and adding small amounts of slaked lime of 1% to the water used for the second hot water treatment.

3. A process for the production of fibers from the covering of cocoa nuts which consists in immersing the material packed in permeable containers for a short period of 2 to 3 hours in hot water, then subjecting the material to a mechanical squeezing treatment, immersing the squeezed material for a second short period of 1 to 2 hours in hot water and then treating the fibers in the usual manner with brush rollers and combs, thus removing the loosened embedding substance of the fiber.

4. A process according to claim 3 in which substances such as small amounts of slaked lime preventing undesired discoloration of the fibers are added to the water used for the second hot water treatment.

5. A process according to claim 3, in which the hot water is caused to circulate in a cycle through the treating vessel and freed from suspended impurities during its expulsion.

In testimony whereof they affix their signatures.

EGON ELÖD.
LUDWIG THOMAS.